United States Patent [19]

Nattrass

[11] 4,364,424
[45] Dec. 21, 1982

[54] END WALL CLOSURE FOR BULK MATERIAL TRANSPORT BAG

[75] Inventor: Peter J. Nattrass, Fox River Grove, Ill.

[73] Assignee: Bulk Lift International, Inc., Carpentersville, Ill.

[21] Appl. No.: 278,195

[22] Filed: Jun. 29, 1981

[51] Int. Cl.³ .............................................. B65D 29/02
[52] U.S. Cl. ........................................ 150/1; 150/11; 222/181
[58] Field of Search ....................... 150/1, 3, 7, 11, 12, 150/0.5; 222/105, 181, 185, 507

[56] References Cited

U.S. PATENT DOCUMENTS

| | | | |
|---|---|---|---|
| 3,374,929 | 3/1968 | Silfverskiöld | 222/181 |
| 3,789,897 | 2/1974 | Saito | 150/11 |
| 3,961,655 | 6/1976 | Nattrass et al. | 150/1 |
| 4,010,784 | 3/1977 | Nattrass | 150/1 |
| 4,143,796 | 3/1979 | Williamson | 150/1 X |
| 4,207,937 | 6/1980 | Sandeman et al. | 150/1 |
| 4,211,266 | 7/1980 | Massey | 150/1 |
| 4,221,250 | 9/1980 | Manerba | 150/11 X |

Primary Examiner—William Price
Assistant Examiner—Sue A. Weaver
Attorney, Agent, or Firm—Kinzer, Plyer, Dorn & McEachran

[57] ABSTRACT

A flat reusable fill/discharge closure for the end wall (bottom or top) of a cloth bag for transporting bulk materials comprises a flexible tube folded back into itself to form a long inner fill/discharge tube and a short outer closure tube having a length less than the radius of an opening in the bag end wall; the tube fold is sewn into the periphery of the end wall opening of the bag with the closure and fill/discharge tubes projecting outwardly. A flat closure is effected by tying the fill-/discharge tube closed, stuffing it into the bag interior, and then closing the closure tube by a drawstring mounted in its outer end.

5 Claims, 6 Drawing Figures

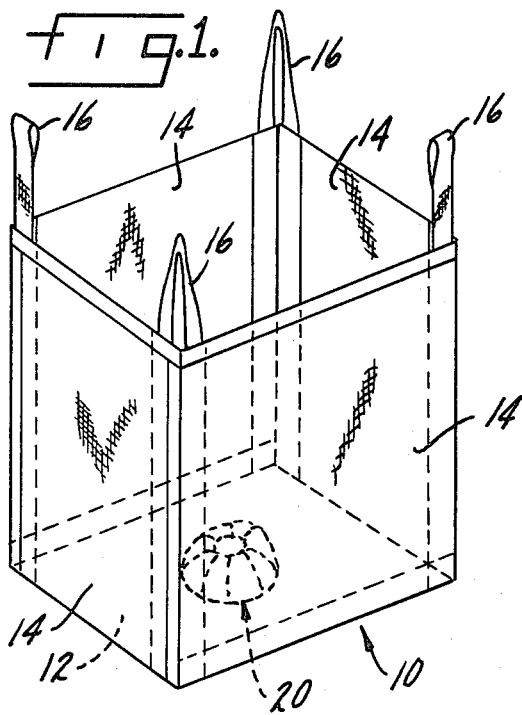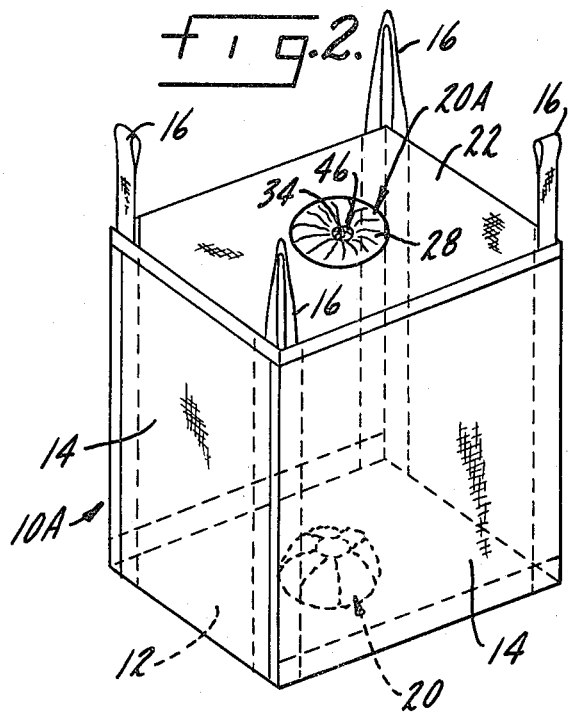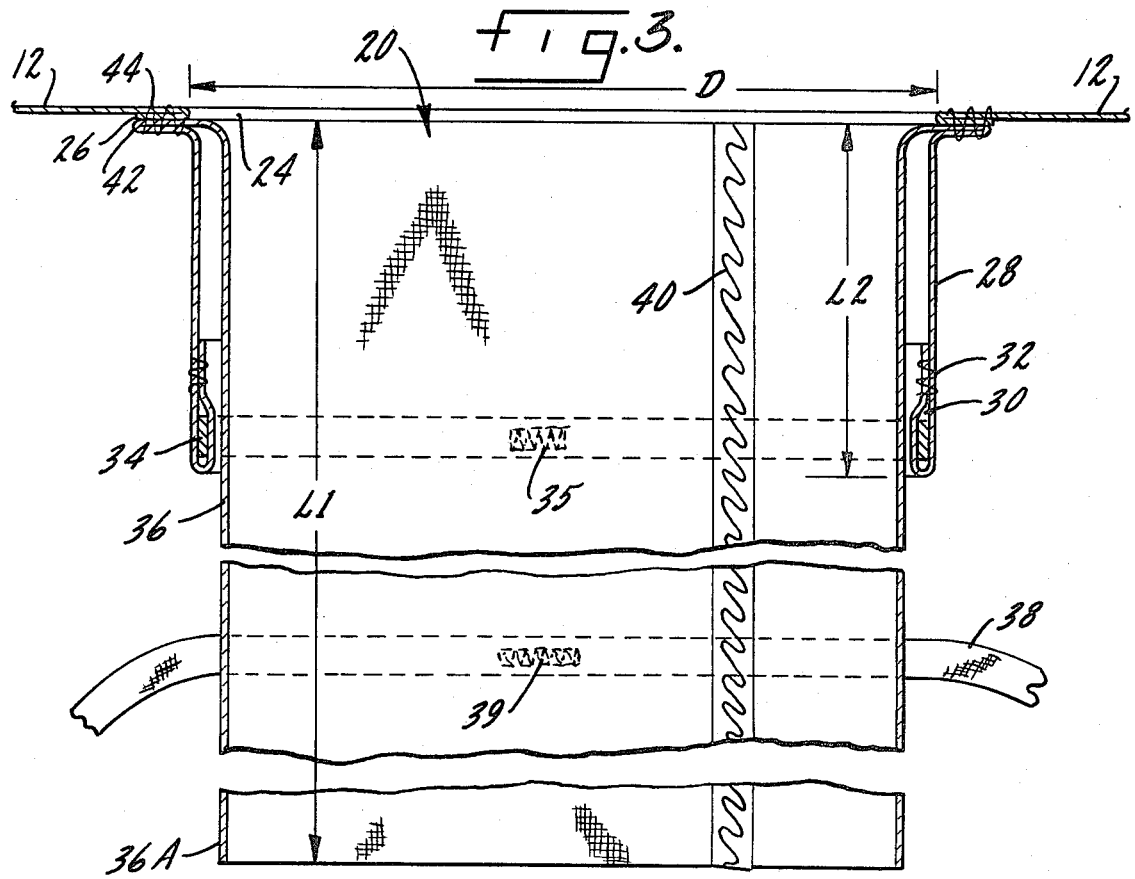

END WALL CLOSURE FOR BULK MATERIAL TRANSPORT BAG

BACKGROUND OF THE INVENTION

The use of large cloth bags to transport bulk quantities of powdered or granular materials, bags which can be lifted and moved by forklift trucks and other material handling equipment having hooks or tines, has become commonplace. The cloth for the bags is usually woven of strong plastic fibers, though natural fibers can also be employed. Bulk transport bags of this general type are disclosed in Nattrass et al U.S. Pat. Nos. 3,961,655 and 4,010,784 and in Sandeman et al U.S. Pat. No. 4,207,937. An improved construction for mounting lifting loops on bulk transport bags of this kind is disclosed in the co-pending U.S. patent application Ser. No. 159,833 of P. J. Nattrass filed June 16, 1980.

One persistent problem in the use of these bulk transport bags has to do with the discharge of the bulk material from a bag once it has reached its destination. To avoid the necessity of turning the bags upside-down to discharge their contents, the bags have sometimes been provided with bottom discharge openings which, of course, must be closed when the bag is in use.

Perhaps the most commonly used discharge closure arrangement is that shown in FIGS. 13-18 of the aforementioned Nattrass et al U.S. Pat. No. 3,961,655. That particular closure, however, has the disadvantage that the closure projects outwardly of the bottom wall of the bag and may be damaged by careless handling of the bag during use, with resultant loss of part or all of the bag contents. A flat closure for a bottom discharge opening in a bulk material transport bag is shown in FIGS. 1-12 of the same patent, but that closure relies upon a loose flap that may be displaced when the bag is filled so that the closure is not fully effective. Furthermore, that closure arrangement also has loose ties projecting outwardly of the bottom wall of the bag so that the closure could be accidentally opened at the wrong time.

The problem to which the present invention is directed, therefore, is the provision of a new and improved discharge closure for a bulk material transport bag that is secure against accidental opening while the bag is in use and that is essentially flat with the bottom of the bag so that the closure is protected against damage during use.

In those instances in which the top of a bulk material transport bag must be closed, similar problems appear. Thus, it is highly desirable to have the top of the bag sewn in place. Any closure for a fill opening in the top of such a bag presents the same difficulties as a bottom closure used to discharge the contents of the bag. Moreover, for both top and bottom closures, it is highly desirable that the closure preclude discharge of dust from the interior of the bag, for effective environmental control, in addition to preventing entry of fine materials that might contaminate the bag contents.

SUMMARY OF THE INVENTION

It is a primary object of the present invention, therefore, to provide a new and improved reusable fill/discharge closure for a bulk material transport bag that is flat against the end wall of the bag when closed and that effectively precludes the passage of dust or other fine material through the closure when in closed condition.

Another object of the invention is to provide a new and improved reusable closure for a bulk material transport bag that is simple and inexpensive in construction and that will last for the full operating life of the bag.

Accordingly, the invention relates to a reusable fill-/discharge closure for a bag for transporting bulk materials, of the kind comprising an end wall joined to a plurality of side walls, all formed of strong, flexible material, and having a plurality of lifting loops mounted on the upper edges of the sidewalls. The closure comprises an opening of diameter D in the end wall, a fill-/discharge tube of strong, flexible material having a diameter at least slightly larger than D and having a length L1, and a closure tube of strong, flexible material having a diameter at least slightly larger than D and having a length L2 no greater than D/2, with L1 > L2. The fill/discharge tube and the closure tube each have one end secured to the periphery of the outlet opening in the end wall of the bag with the fill/discharge tube disposed inwardly of the closure tube and both projecting outwardly of the end wall of the bag. A drawstring is disposed in a peripheral pocket in the outer end of the closure tube, and tie means are provided for releasably closing the outer end of the fill/discharge tube, whereby the closed fill/discharge tube can be stuffed into the interior of the bag through the end wall opening and the drawstring tightened to form a flat openable closure for the end wall opening.

BRIEF DESCRIPTION OF THE DRAWINGS

The invention is illustrated more or less diagrammatically in the accompanying drawings, in which:

FIG. 1 is a perspective view of an open top bulk transport bag incorporating a reusable discharge closure constructed in accordance with the present invention;

FIG. 2 is a perspective view, similar to FIG. 1, of a closed top bulk transport bag provided with both fill and discharge closures constructed in accordance with the present invention;

FIG. 3 is a sectional elevation view of a reusable fill/discharge closure, constructed in accordance with one embodiment of the present invention, with the closure in its open or fill/discharge condition;

DESCRIPTION OF THE PREFERRED EMBODIMENTS

Figure 4:
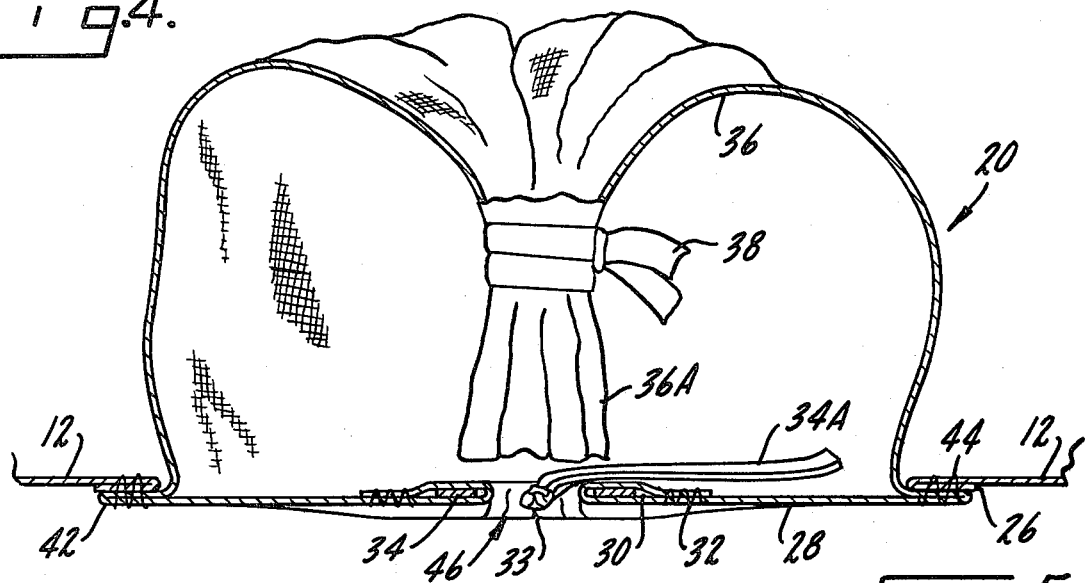
FIG. 4 is a sectional elevation view, like FIG. 3, but showing the bag closure in closed condition.

FIG. 1 of the drawings illustrates a bulk material transport bag 10 that includes a reusable discharge closure 20 constructed in accordance with one preferred embodiment of the present invention. The bag 10 includes a bottom end wall 12 joined to a plurality of side walls 14, all formed of strong, flexible cloth. Bag 10 is of rectangular configuration with four side walls 14; other configurations can be used as desired. Bag 10 further includes four lifting and support loops 16 secured to the tops of the bag side walls 14 at the corners of the bag. The mounting arrangement for lifting loops 16 is not critical to the invention, though the mounting arrangement described in the aforesaid pending U.S. application Ser. No. 159,833 of P. J. Nattrass is preferred.

FIG. 2 illustrates another bulk material transport bag 10A generally similar in construction to the bag 10 of FIG. 1. Thus, bag 10A includes a bottom end wall 12 to which a plurality of side walls 14 are secured, with lifting loops 16 affixed to the top corners of the bag. Like bag 10, bag 10A incorporates a flat reusable closure 20 in the bottom end wall 12. Bag 10A, however, also comprises a top end wall 22 completely covering the upper end of the bag. This top end wall 22 incorporates a fill closure 20A having the same construction as the discharge closure 20.

Figure 5:
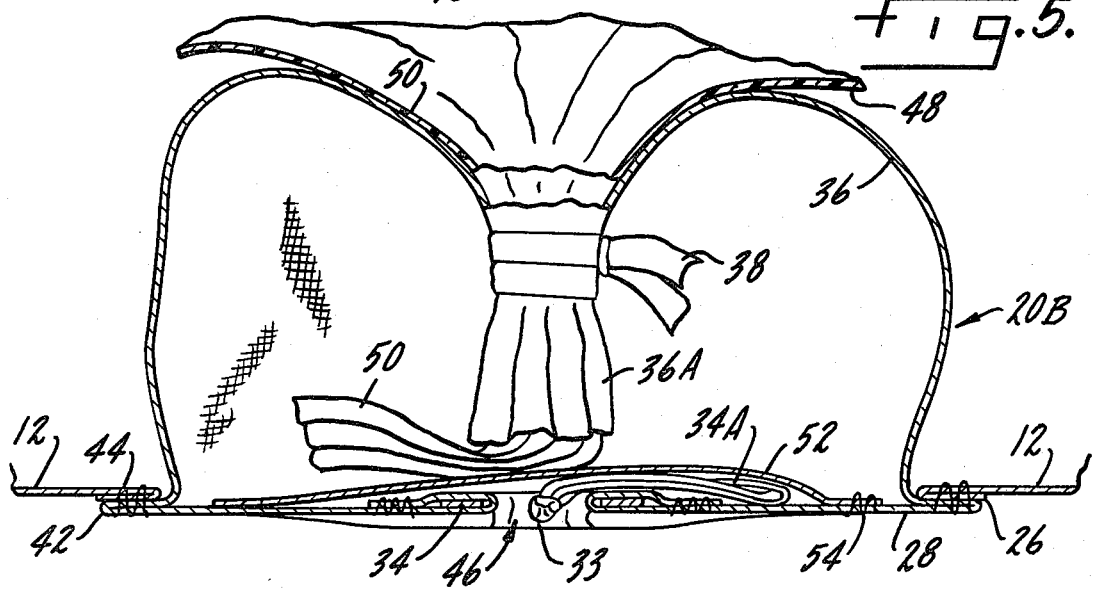
FIG. 5 is a sectional elevation view like FIG. 4 showing another embodiment of the invention in closed condition.
Figure 6:
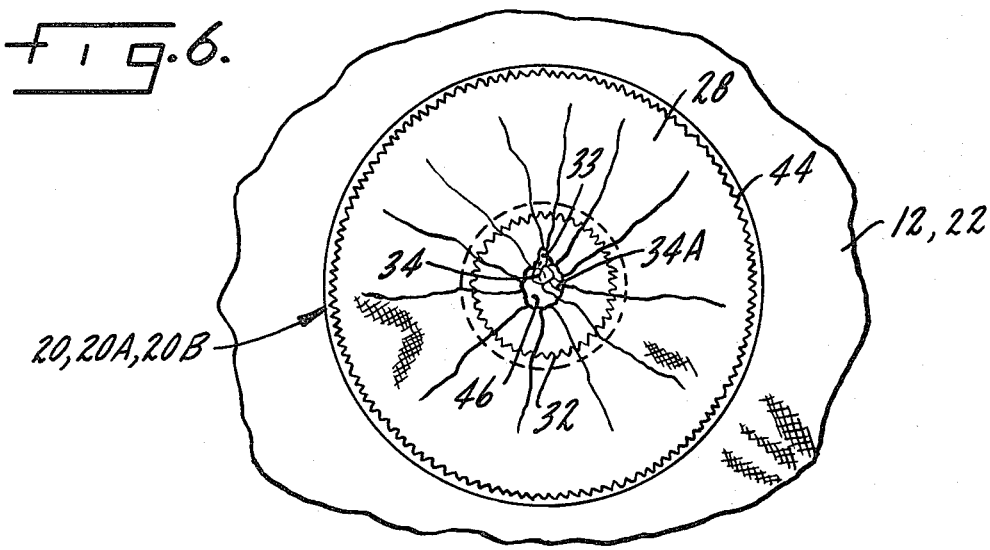
FIG. 6 is a bottom view, showing the closures of FIGS. 3 and 4 in closed condition, which is also illustrative of the closed condition for the embodiment of FIG. 5 and for the top closure of FIG. 2.

FIGS. 3, 4 and 6 illustrate a bottom end wall discharge closure 20 constructed in accordance with one preferred embodiment of the present invention, a closure that may be used in the bottom end wall 12 of either of the bags 10 and 10A. Furthermore, the construction shown in FIGS. 3-6 may be used directly, without change, for the fill closure 20A in the top end wall 22 of bag 10A (FIG. 2) simply by re-orienting the illustrated closure structure through an angle of 180°.

As shown in FIG. 3, a discharge opening 24 having a diameter D is cut into the central portion of the bottom end wall 12 of the bulk material transport bag. A closure tube 28 is included in the bag closure 20; closure tube 28 is be formed of a strong flexible material, comparable to the bag cloth, and has a diameter at least slightly larger than the diameter D of discharge opening 24. Closure tube 28 extends outwardly from the bottom end wall 12 of the bag. The outer end of closure tube 28 is folded back to form a peripheral pocket 30, the pocket being secured by means of an anchor stitching 32. A "drawstring" 34, usually a tape of strong webbing, is disposed in the peripheral pocket 30; the ends 34A of drawstring 34 extend out of pocket 30 through a slit 33 as best shown in FIGS. 4 and 6. In the preferred construction, the drawstring or tape 34 is tacked into pocket 30, as by suitable tack sewing 35 (FIG. 3), to preclude loss of the drawstring.

Closure 20, as shown in FIG. 3, further comprises a discharge tube 36 that is also formed of a strong flexible material and has a diameter at least slightly larger than the diameter D of the end wall opening 24. Discharge tube 36 has an effective length L1 substantially greater than the length L2 of closure tube 28. A closure tie 38 is affixed to discharge tube 36, as by tack sewing 39, at a position well below the bottom edge of closure tube 28.

In assembling closure 20, the inner edge 26 of the discharge opening 24 in the bag end wall 12 is preferably folded back on itself for purposes of reinforcement. The discharge tube 36 and closure tube 28 are then secured to the periphery of opening 24 by suitable means such as anchor stitching 44 encompassing the entire opening (FIGS. 3 and 6). Thus, as assembled, closure tube 28 and discharge tube 36 project outwardly of the bag end wall 12, the discharge tube being disposed within the closure tube.

In the preferred construction illustrated in FIGS. 3 and 4, closure tube 28 and discharge tube 36 are not separate individual members. Instead, these two tubes are formed from a single elongated tube of strong flexible material, which may be most economically fabricated with a single seam 40. That unitary tube is folded back into itself, the fold being identified by reference numeral 42 in FIG. 3. The fold end 42 of the resulting dual concentric tube is then sewn to the folded reinforcement edge 26 of the discharge opening 24 in the bottom end wall 12 of the bag by stitching 44. This particular construction is simpler and more economical than any arrangement using individual tubes and it is also basically stronger.

FIG. 3 shows closure 20 in its open condition. Before filling the bag, tie 38 is first wrapped tightly around discharge tube 36 and then tied, sealing off the outer end of the discharge tube. After being tied off, discharge tube 36 is stuffed back into the interior of the bag in the manner illustrated in FIG. 4. It can be seen that it is readily possible to move the entire discharge tube 36, including tie 38, up into the interior of the bag above end wall 12.

Drawstring 34 is then tightened and tied. Because the length L2 of closure tube 28 is smaller than one-half the diameter D of discharge opening 24, tightening and tying off of drawstring 34 brings the closure tube to the flat closed position shown in FIGS. 4 and 6, with only a small opening 46 remaining at the center of closure tube 28. It is then a simple matter to stuff the free ends 34A of drawstring 34 up into the interior of the bag, within the confined area defined by discharge tube 36. Thus, the final closed condition for closure 20 is as shown in FIGS. 4 and 6, with no part of the closure projecting appreciably beyond the level of the bottom end wall 12 of the bag.

With closure 20 in the closed condition shown in FIGS. 4 and 6, the bottom of the bulk transport bag is effectively sealed. When the bag is filled with granular or powdered material, the initial bulged condition for discharge tube 36 shown in FIG. 4 is altered (flattened) because the contents of the bag push the discharge tube down flat along the bag bottom end wall. The contents of the bag cannot escape through discharge tube 36, as long as tie 38 is tightly tied. Furthermore, the end of discharge tube 36 is usually deflected to one side, away from the small opening 46 in closure tube 28. The closure is essentially dust-tight.

After the bulk transport bag has reached its destination, discharge of the bag contents is simple and expeditious. First, the free ends 34A of drawstring 34 are pulled back through opening 46 to the outside of closure 20, the drawstring is untied, and closure tube 28 is opened up back to the position shown in FIG. 3. It is then a simple matter to pull the end 36A of discharge tube 36 outwardly of the bag through opening 24. The end 36A of discharge tube 36 can then be aligned with a receiving bin, or fitted over an input fitting to a storage container, after which tie 38 is untied and unwrapped. The contents of the bag then empty out through discharge tube 36 in a controlled manner, with minimum environmental problems. When empty, the bag is ready for re-use, since all components remain in place, closure 20 being back in the condition illustrated in FIG. 3.

For some materials, particularly very fine powders or granular materials accompanied by substantial quantities of dust, it is customary to use a plastic film liner for the basic bulk transport bag. Also, with materials of this kind, it may be desirable to provide even further protection from the loss of dust through the closure. FIG. 5 illustrates the adaptation of the invention to this situation in a closure 20B.

The usual plastic film liner 48 comprises an integral discharge tube 50. The plastic discharge tube 50 is pulled through the end 36A of the closure discharge tube 36. Thus, tie 38 serves to seal off the discharge tube of the plastic liner. Accordingly, no modification of the closure is required when use of an inner plastic liner is indicated for the bulk transport bag.

For added dust protection, a supplemental closure member or flap 52 is incorporated in closure 20B of FIG. 5. Flap 52 may be the portion of the bottom end wall 12 of the bag that was cut out to form outlet opening 24. Flap 52 is attached to the interior of closure tube 28, at one point, as by tack sewing 54. In opening closure 20B, after closure tube 28 has been opened, it is a simple matter to pull flap 52 out of the way and thus provide access to discharge tube 36 (and the liner tube 50). In closing closure 20B, flap 52 is moved up to the position shown in FIG. 5 immediately prior to the tightening of drawstring 34 to close the closure tube 28. It is thus seen that flap 52 provides an effective supplemental dust cover when closure 20B is closed but does not interfere with the opening and closing operations.

As previously noted, the top end wall closure 20A of the closed-top transport bag 10A (FIG. 2) can employ the same closure structure as shown in FIGS. 3, 4 and 6. This is equally true of the modified closure 20B of FIGS. 5 and 6. In each situation, the operation remains unchanged.

It is not essential that the fold edge 42 of the continuous tube constituting tubes 28 and 32 be sewn to the outer surface of end wall 12 as shown in FIGS. 3–6. The tubes can be secured to the inner surface of the bag end wall if desired. Other minor modifications will also be apparent. However, it is essential that the closure tube length L2 be no greater than D/2; preferably L2 is slightly smaller than D/2. Furthermore, L1 should be substantially larger than L2; if it is not, it may be difficult to get all of discharge tube 36 into the interior of the bag.

The following dimensions are typical:
D: 10 inches
L2: 4.75 inches
L1: 17.5 inches However, all of these dimensions are subject to change to meet the requirements of varying bags and the materials being transported.

I claim:

1. In a bag for transporting bulk materials, of the kind comprising an end wall joined to a plurality of side walls, all formed of strong, flexible material, and having a plurality of lifting loops mounted on the upper edges of the sidewalls, an improved reusable fill/discharge closure comprising:

an opening of diameter D in the end wall;
   a fill/discharge tube of strong, flexible material having a diameter at least slightly larger than D and having a length L1;
   a closure tube of strong, flexible material having a diameter at least slightly larger than D and having a length L2 no greater than D/2, with L1>L2;
   the fill/discharge tube and the closure tube each having one end secured to the periphery of the outlet opening in the end wall of the bag with the fill/discharge tube disposed inwardly of the closure tube and both projecting outwardly of the end wall of the bag;
   a drawstring disposed in a peripheral pocket in the outer end of the closure tube;
   and tie means for releasably closing the outer end of the fill/discharge tube;
   whereby the closed fill/discharge tube can be stuffed into the interior of the bag through the end wall opening and the drawstring tightened to form a flat openable closure for the end wall opening.

2. In a bag for transporting bulk materials, of the kind comprising an end wall joined to a plurality of side walls, all formed of strong, flexible material, and having a plurality of lifting loops mounted on the upper edges of the sidewalls, an improved reusable fill/discharge closure comprising:

an opening of diameter D in the end wall;
   an elongated tube of strong, flexible material having a diameter at least slightly larger than D, folded back into itself to form an inner fill/discharge tube having a length L1 and an outer closure tube having a length L2, with L2 no greater than D/2 and L1>L2;
   the fold end of the tube being secured to the periphery of the opening in the end wall of the bag with the closure tube and the fill/discharge tube projecting outwardly of the end wall of the bag;
   a drawstring disposed in a peripheral pocket in the outer end of the closure tube;
   and tie means for releasably closing the outer end of the fill/discharge tube;
   whereby the closed fill/discharge tube can be stuffed into the interior of the bag through the end wall opening and the drawstring tightened to form a flat openable closure for the end wall opening.

3. An improved reusable fill/discharge closure for a bulk material transport bag, according to claim 1 or claim 2 in which the bag end wall and the tubes are all formed of a woven fabric and the tubes are sewn to the periphery of the end wall opening.

4. An improved reusable fill/discharge closure for a bulk material transport bag, according to claim 3, in which the tie means comprises a woven fabric tie sewn to the discharge tube at a point outwardly displaced from the outer end of the closure tube.

5. An improved reusable fill/discharge closure for a bulk material transport bag, according to claim 1 or claim 2, and further comprising:
   a supplemental closure member, having a diameter approximately equal to D, attached to the inside of the closure tube at a point adjacent the periphery of the end wall opening, the supplemental closure member extending across the end wall opening to afford a dust cover when the closure is closed.

* * * * *